(12) United States Patent
Collister et al.

(10) Patent No.: US 7,909,410 B2
(45) Date of Patent: Mar. 22, 2011

(54) ROOFING SAW

(76) Inventors: Kenneth F. Collister, North Branch, MI (US); Brenden J. Jones, Rochester Hills, MI (US)

( * ) Notice: Subject to any disclaimer, the term of this patent is extended or adjusted under 35 U.S.C. 154(b) by 423 days.

(21) Appl. No.: 11/943,782

(22) Filed: Nov. 21, 2007

(65) Prior Publication Data
US 2008/0115369 A1    May 22, 2008

Related U.S. Application Data

(60) Provisional application No. 60/866,736, filed on Nov. 21, 2006.

(51) Int. Cl.
*B26D 5/00*    (2006.01)
(52) U.S. Cl. ........................ 299/39.3; 299/39.1
(58) Field of Classification Search ............... 299/36.1, 299/39.1, 39.3
See application file for complete search history.

(56) References Cited

U.S. PATENT DOCUMENTS

| | | | | |
|---|---|---|---|---|
| 4,317,282 A * | 3/1982 | Pace | ............................ | 30/122 |
| 5,156,156 A * | 10/1992 | Ruzich | ............................ | 30/382 |
| 6,112,736 A * | 9/2000 | Bearden | ............................ | 125/13.01 |
| 6,349,712 B1 * | 2/2002 | Halstead | ............................ | 125/12 |
| 6,409,187 B1 * | 6/2002 | Crow, Jr. | ............................ | 280/47.34 |
| 6,932,163 B2 * | 8/2005 | Stoffels et al. | ............................ | 173/24 |
| 2007/0222274 A1 * | 9/2007 | Manners | ............................ | 299/36.1 |

* cited by examiner

*Primary Examiner* — John Kreck
(74) *Attorney, Agent, or Firm* — Honigman Miller Schwartz and Cohn LLP

(57) ABSTRACT

A roofing saw assembly and corresponding method of use for cutting into a roof a predetermined depth. The saw assembly may or may not include the saw itself. But it otherwise includes a frame having a base and a handle. Front and rear wheel sets are carried on the frame for supporting the frame in rolling movement above a roofing surface. A dead-man brake assembly is associated with at least one of the wheel sets wherein the brake is engaged with the wheel set until it is released to permit wheel rotation. A saw platform is carried on the frame, with the platform being adapted to support the power saw a predetermined height above the roofing surface. A height adjuster is disposed between the frame and the platform for adjusting the saw platform relative to the frame. The assembly can be used to cut roof sections of a predetermined size for easy and tidy removal.

12 Claims, 6 Drawing Sheets

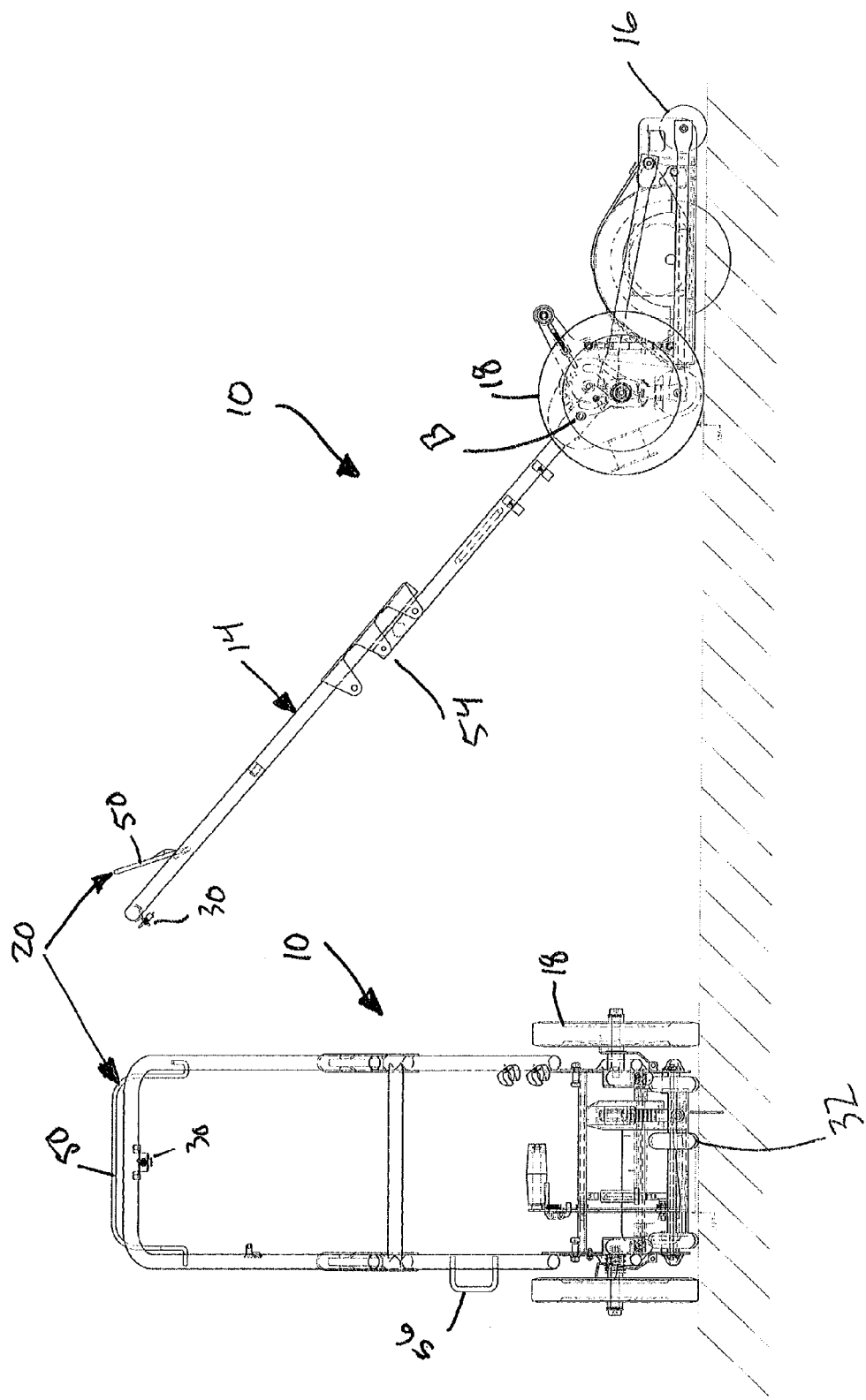

ROOFING SAW

CROSS-REFERENCE TO RELATED APPLICATION

This application claims priority to U.S. Provisional Patent Application Ser. No. 60/866,736, filed Nov. 21, 2006, which is hereby incorporated by reference.

TECHNICAL FIELD

The subject invention relates to the roofing arts, and more particularly to saw assemblies for cutting roofing material.

BACKGROUND OF THE INVENTION

Roofers routinely use hand shearing tools to remove old shingles before they re-roof with new shingles. But removing existing roofing with hand tools alone is time-consuming and tiring. And in the process, this old procedure generates debris of varying size, much of which falls off the roof and onto landscaping surrounding the house. This can damage the landscaping and create a significant mess. In fact, clean-up of debris represents a large portion of the overall re-roofing task.

SUMMARY OF THE INVENTION

According to one aspect of the invention, there is a roofing saw assembly for cutting into a roof a predetermined depth. The saw assembly may or may not include the saw itself. But it otherwise includes a frame having a base with a front end and a rear end, and a handle extending generally upwardly from the rear end. A front wheel set is rotatably carried on the front end of the frame for supporting the frame in rolling movement above a roofing surface. A rear wheel set is rotatably carried on the rear end of the frame for supporting the frame in rolling movement above a roofing surface. A dead-man brake assembly is associated with at least one of the wheel sets wherein the brake is engaged with the wheel set until it is released to permit wheel rotation. A saw platform is carried on the frame, with the platform being adapted to support the power saw a predetermined height above the roofing surface. A height adjuster is disposed between the frame and the platform for adjusting the saw platform relative to the frame.

According to another aspect of the invention, there is a method of removing roofing material with a power tool having a circular saw blade. The method includes the steps of: mounting the saw on a wheeled cart having a dead-man brake; adjusting the vertical position of the saw on the cart so that the blade will cut a predetermined depth into old roofing; releasing the dead man brake; cutting a roof section; and removing the roof section.

The invention makes it easier and faster to remove old roofing material by allowing roofers to cut it into neat and manageable sections. Contractors and homeowners will benefit from a timely job and a well maintained landscape. The invention also makes cutting ridge vent openings and shingle edge projections quicker and safer.

FIGURES IN THE DRAWINGS

The present invention will now be described, by way of example, with reference to the accompanying drawings, in which:

FIG. 6A is a rear view of the same preferred embodiment; and

FIG. 6B is a side view of the preferred embodiment showing blade penetration in a roof.

DETAILED DESCRIPTION

Figure 1:
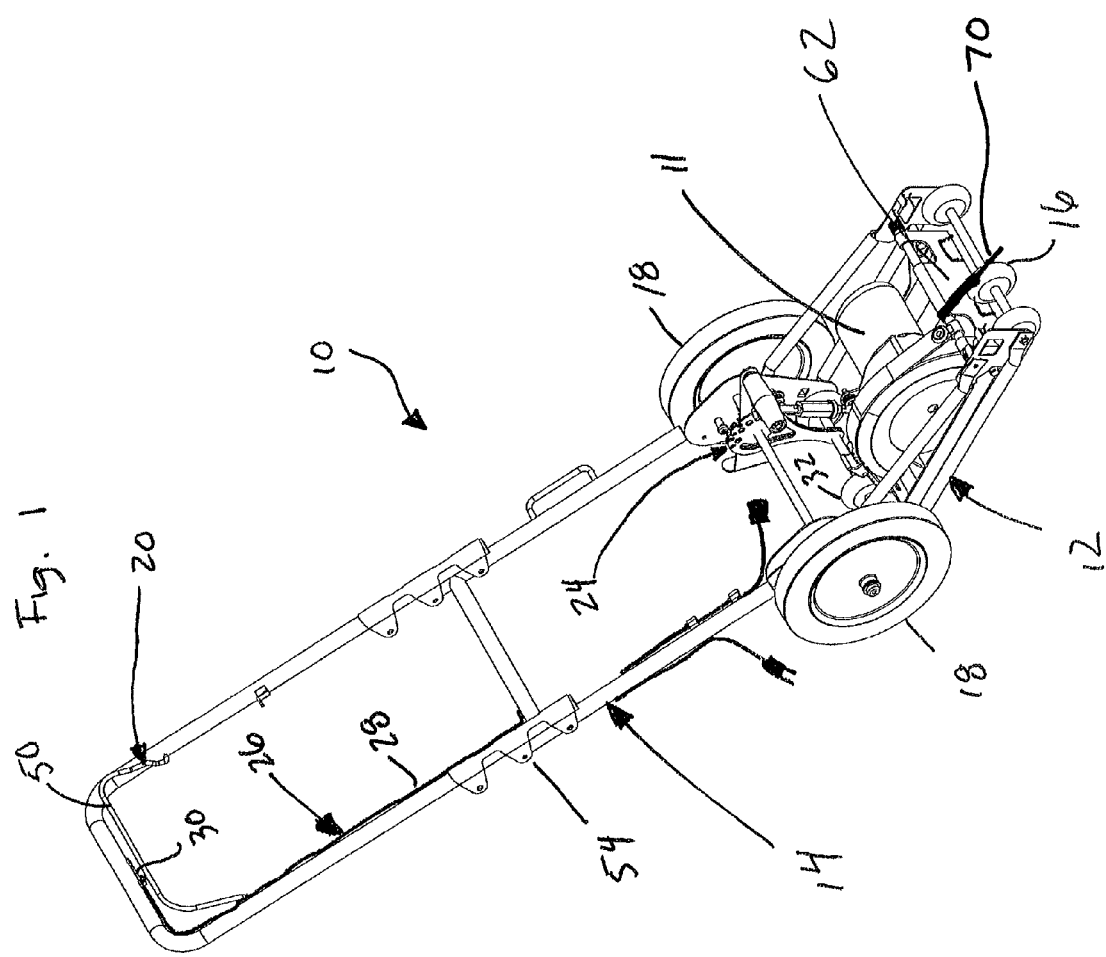
FIG. 1 is a front perspective view of a preferred embodiment.

The present invention will now be described, by way of example, with reference to the accompanying drawings in which a roofing saw assembly is generally shown at 10.

According to a broad conception of the invention, there is a roofing saw assembly 10 for cutting into a roof a predetermined depth. The saw assembly 10 comprises, among other things, a saw 11. It also includes a frame having a base generally indicated at 12 with a front end and a rear end, and a handle generally indicated at 14 extending generally upwardly from the rear end. A front wheel set 16 is rotatably carried on the front end of the base for supporting the frame in rolling movement above a roofing surface. A rear wheel set 18 is rotatably carried on the rear end of the base for supporting the frame in rolling movement above a roofing surface. A dead-man brake assembly generally indicated at 20 is associated with at least one of the wheel sets 16, 18 wherein the brake is engaged with the wheel set until it is released to permit wheel rotation. A saw platform generally indicated at 22 is carried on the base, with the platform 22 being adapted to support a power saw 11 a predetermined height above the roofing surface. A height adjuster generally indicated at 24 is disposed between the frame and the platform for adjusting the saw platform relative to the frame.

An even broader conception of the invention is to provide the aforementioned assembly without the saw itself. In fact, this is how the assembly could be sold: i.e. to roofers who already own their own saws or other power hand cutting tools such as circular saws, grinding tools, and the like. In the typical case, the saw will be an electric circular saw of the type commonly available through retail stores and commonly used by roofers and other construction workers. One benefit of the invention is that it enhances the use of these commonly available tools. It does not require special tools.

The embodiment shown in the figures further includes an electrical circuit generally indicated at 26 carried by the frame including a switch 30 and a connection or plug for a power saw. The switch 30 is a dead-man switch that remains in the off position unless and until it is positively engaged by an operator. In one embodiment, the circuit includes a "Y" shaped power cord 28 having three ends. A first end connects with the switch 30. A second end includes a female plug adapted to mate with a male plug from the saw. A third end includes a male plug adapted to engage with a plug on an extension power cord. In another embodiment, the circuit includes a cord handing from the switch 30 with a female plug for engaging the male plug on the saw. The embodiment also includes a cord extending away from the switch 30 with a male plug for plugging into an extension cord.

The rear wheel set 18 includes first and second wheels disposed co-axially on the base where the first and second wheels are located on either side of the base as shown in the figures. This design with the wheels spread apart provides stability to the cart, which helps on a pitched roof.

Figure 2:
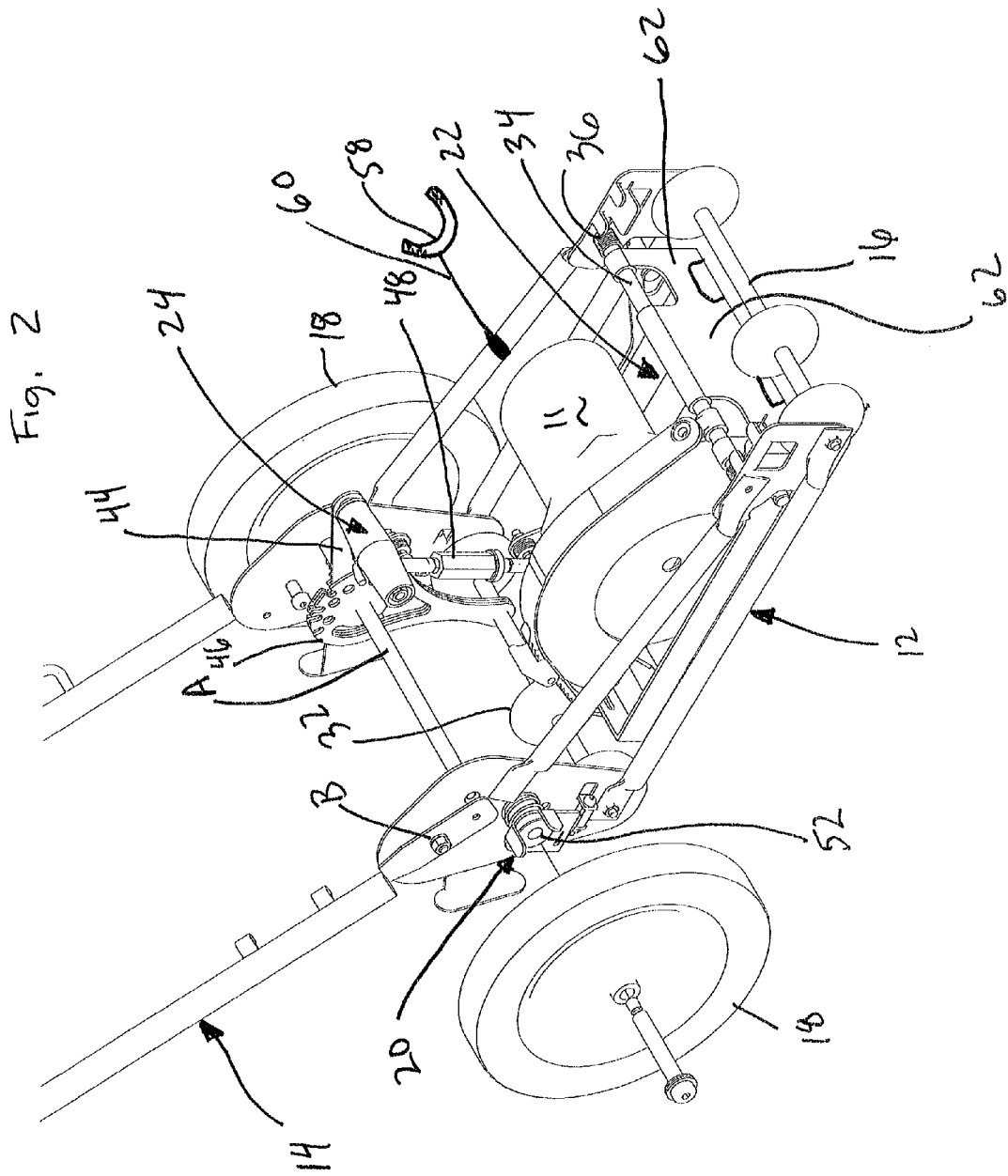
FIG. 2 is a closer front perspective view with a rear wheel exploded away.
Figure 4:
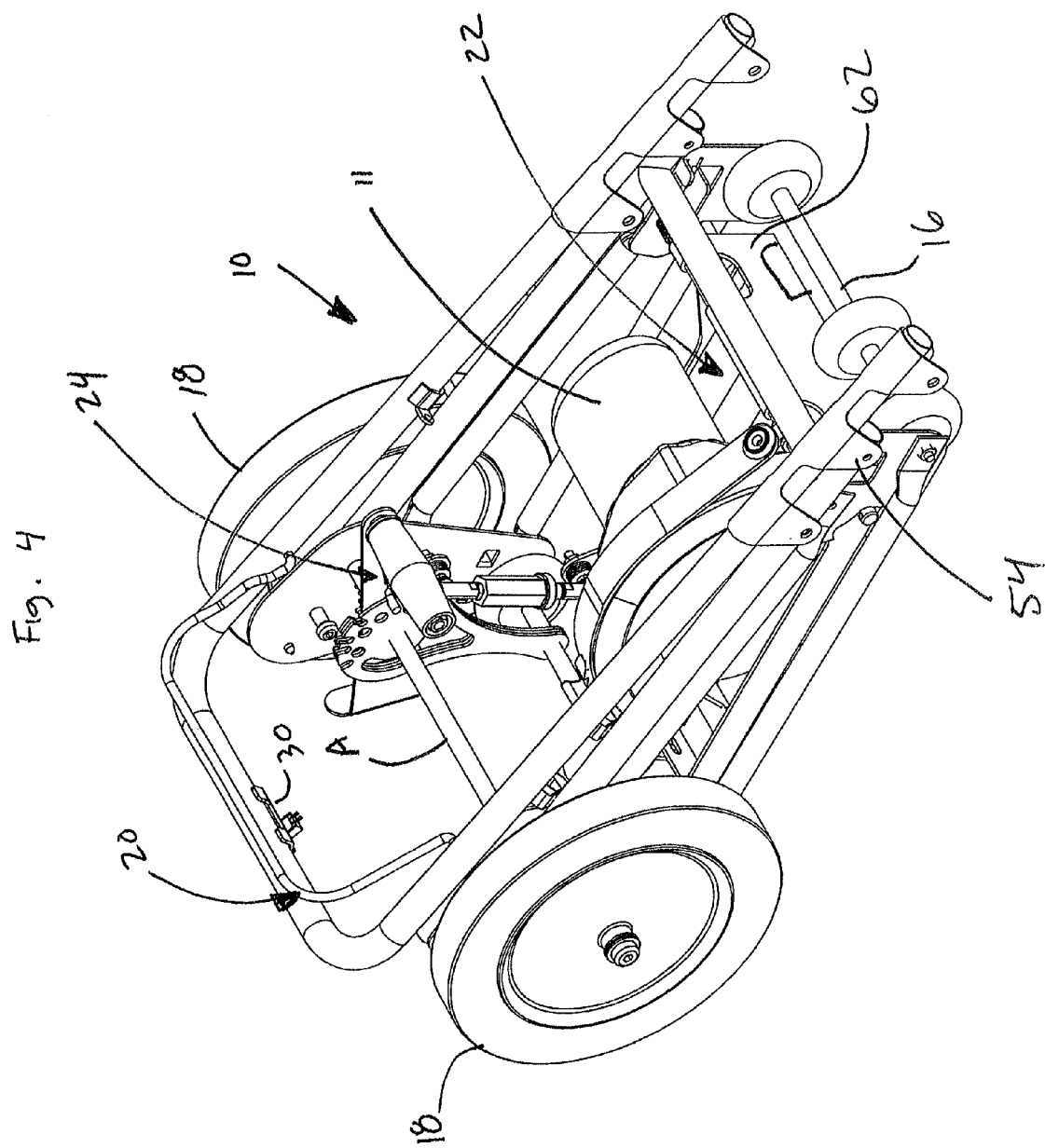
FIG. 4 is front perspective view with the handle in a folded position.

The front wheel set 16 includes a plurality of wheels that are smaller in diameter than the rear wheels. This provides easier maneuverability and handling with the cart. With the front wheels being smaller and lighter, the front of the cart can be lifted and positioned easily and with minimum effort. In a preferred embodiment, the wheel set includes three wheels positioned on common axis (e.g. an axle) as shown in FIGS. 1, 2, and 4. The middle wheel is positioned along the axis (e.g. as shown) so that it can serve as a guide for cutting ridge vents. When it rides along the top of the roof ridge, the saw blade can make a cut in the roof at an appropriate interval from the ridge.

The assembly further includes an auxiliary wheel set 32 carried by the base adjacent the rear wheel set. The auxiliary wheel set 32 is disposed between the rear wheels 18 as shown in the figures. The auxiliary wheel set 32 may also be raised somewhat above the rear wheel set 18. These wheels 32 will support the base if one or both of the rear wheels 18 will not ride on the roof. This can happen if the roofer is cutting shingles on the side of the roof and one of the rear wheels is hanging off the roof. This can also happen, for example, if the roofer is cutting the ridge caps, and both rear wheels are in the air and not on the roof. In one embodiment, the auxiliary wheel set 32 is mounted slightly above the level of the rear wheels 18 so that the set 32 does not touch the roof when the rear wheels do.

Figure 5:
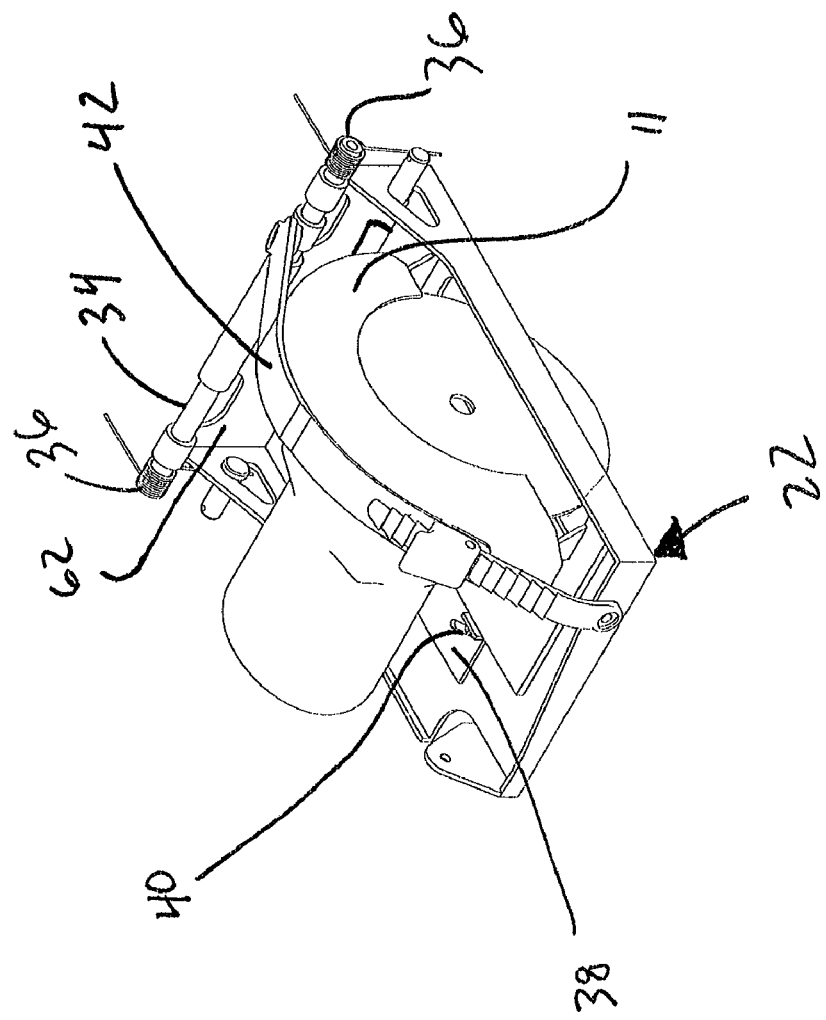
FIG. 5 is a rear perspective view of the saw platform.

The saw platform 22 is shown in detail in FIG. 5. The manner in which the platform can be connected to the base is shown elsewhere in the figures. The platform is supported at its front end by axle 34 that connects to the base. Torsion springs 36 located on the axle 34 as shown provide support to the platform. The platform 22 is sized to accommodate a variety of saws and related hand tools (such as grinders) in a variety of sizes. It includes the sliding restrictor plate 38 that abuts the side of the saw to help secure it. A screw 40 or the like can extend through a channel in the restrictor plate 38 to lock it in a given lateral position. The saw platform 22 may further include the securing strap 42 shown in FIG. 5. This can be a ratcheting-type strap of the type known in the snowboarding arts. It allows a given saw to be secured and released in a quick and easy way.

Figure 3:
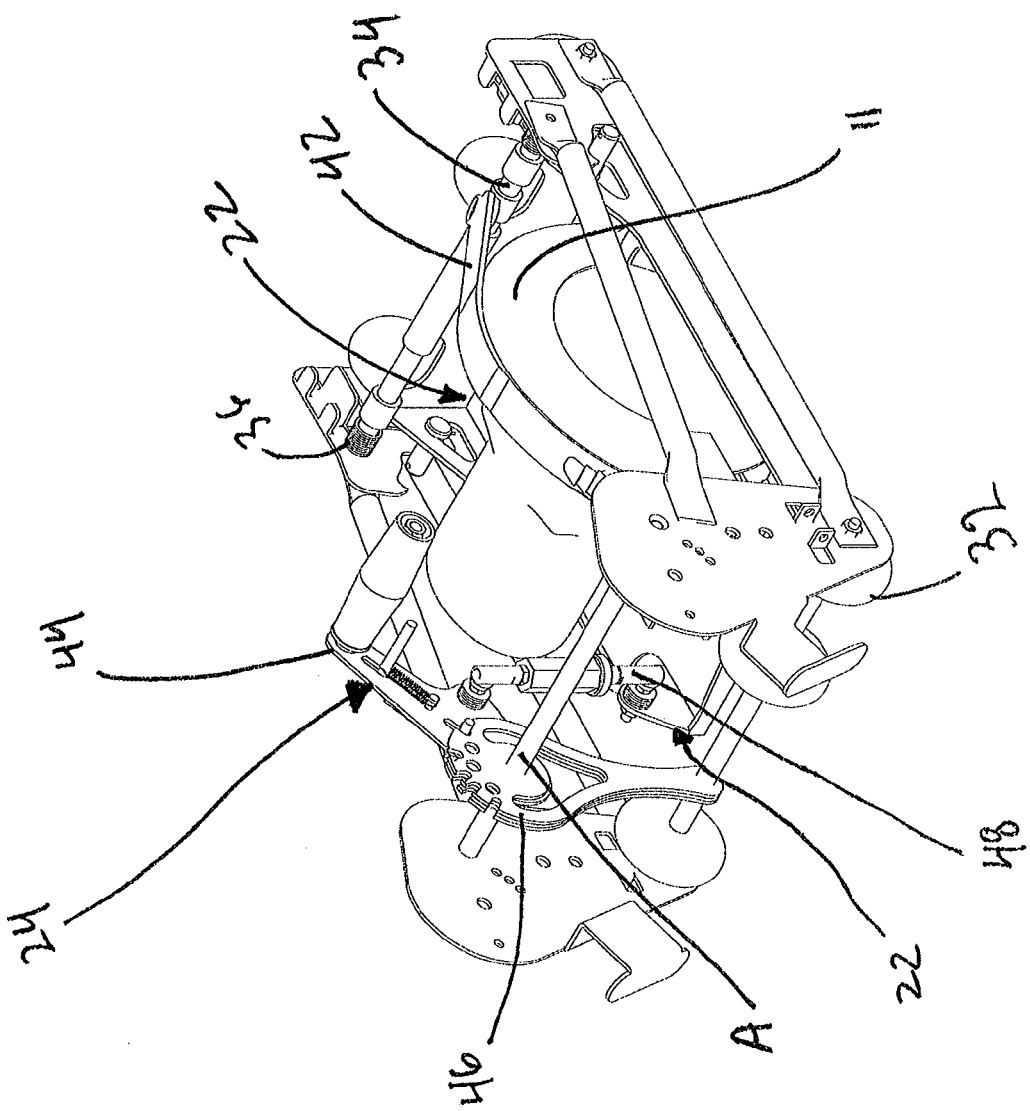
FIG. 3 is a rear perspective view with the handle removed.

The height adjuster 24 includes discrete adjustment, and continuous adjustment between the discrete adjustments. This is best shown in FIGS. 3 and 4. The discrete adjustment intervals are set based on common situations a roofer may encounter—like 2-shingle layers, 3-shingle layers, half inch plywood, three-quarter-inch plywood, etc. The continuous adjustment permits for fine adjustment between these discrete adjustments.

The discrete adjustment includes handle assembly 44 that pivots about an axis A between the two fixed plates 46 that are attached to the base. The plates 46 have notches that are formed to provide the adjustment intervals. The handle 44 has the spring-loaded release trigger that interacts with a pin that is biased against the force of a spring into the notches. The handle 44 is linked to the saw platform 22 by means of the elongated continuous adjuster 48.

The continuous adjuster 48 includes the two shafts that are interconnected with the threaded adjuster. At least one of the shafts includes threads as well to interact with the adjuster. As the adjuster is rotated about the axis of the shafts, it provides for fine adjustment between the discrete intervals.

The dead-man brake 20 interacts with the rear wheels 18. It can also be referred to as a reverse brake because it is engaged and braking until the operator releases it. It includes the brake handle 50 pivotally disposed at the top of the handle as best shown in FIGS. 1 and 6. The brake handle 50 operates a remote control cable that extends down the handle to the rear wheels. A spring biases a pin or pad or pronged member 52 against one or both of the rear wheels to prevent the rear wheels from rotating. If the operator depresses the brake handle 50, this will pull on the cable and retract the pad or pin away from the wheel(s) to permit rotation.

As shown best in FIGS. 1, 4, and 6, the handle (e.g. the top part) 14 includes a hinge structure 54 along its length to permit one part of the handle to pivot about the hinge from a collapsed position over the other (e.g. bottom) part, to an extended position away from the other part. The collapsed position is shown in FIG. 4; and the extended position is shown in FIGS. 1 and 6. This hinge structure 54 allows the user to make the assembly as compact as possible for moving it, especially up a ladder and onto a roof. Spring-biased pins or buttons can extend into holes to hold the handle 14 in the extended position.

The handle is also pivotally attached to the base about axis B with a conventional spring-biased pin lock that can lock the handle in any one of several orientations relative to the base. This pivotal attachment, together with the hinge 54, facilitates folding the cart into the collapsed position. This pivotal attachment also permits adjustment of the handle for the comfort of the operator taking into account the height of the operator and the pitch of the roof. A grip 56 may further be provided on the handle 14 for further convenience in carrying the cart in the collapsed position.

Certain embodiments will also include a saw trigger depression device 58. Power saws typically include a dead man trigger-one that is biased into the "off" position. When this is the case, the operator needs some device to hold the trigger in the "on" position. In one embodiment, this device 58 is a strap with a hook and loop fastener. In another embodiment, it can be a clip. In either case, the trigger depression device 58 may be secured to the frame with a tether 60.

Certain embodiments may also include a debris shield 62 disposed on the frame for blocking debris flying from the saw. The debris shield 62 can include drain or weep holes for allowing saw dust and other debris to flow away from the saw 11 and off the plate arm 22 in a controlled way.

As shown in FIG. 1, certain embodiments can also include an alignment guide 70. The alignment guide is mounted on the base (e.g. on the debris shield 62) to extend in front of the base to indicate the line where the saw blade is cutting. The guide 70 can be telescoping members that are aligned with the saw blade and that telescope out from the debris shield 62 to show the saw's cutting line.

According to another conception of the invention, there is an inventive method of removing roofing material with a saw having a saw blade. The method generally includes the steps of: mounting the saw on a wheeled cart having a dead-man brake; adjusting the vertical position of the saw on the cart so that the blade will cut a predetermined depth into old roofing; releasing the dead man brake; cutting a roof section; and removing the roof section.

This method can describe at least three procedures: 1) removing old roofing; 2) trimming shingles on the sides of a roof; and 3) cutting elongated ridge vents. In the case of cutting ridge vents, the saw assembly 10 and its method of use are beneficial because the old way of cutting ridge vents was simply to use a hand tool like a circular saw. But this can lead to debris and nails hitting the roofer in the face. Using the saw assembly 10, the roofer is standing, and at a safe distance from flying debris and nails.

The mounting step includes setting the saw 11 on the platform 22 of the cart 10, and securing it with the strap. The mounting step could also include loosening the restrictor plate 38 (if there is one), abutting it against the saw, and then tightening the restrictor plate to hold the saw in place. At some point, the operator could also depress the trigger with the trigger depression device 58 or the like.

The adjusting step includes making discrete adjustments in steps of a predetermined size, and making continuous adjustment between the steps as needed. This can be done with the height adjustment mechanisms 24 described above.

At some point in the process, the roofer could collapse or extend the handle 14, as needed. Generally, it is appropriate to collapse the handle when moving the assembly 10, especially when moving it up or down a ladder.

The cutting step includes depressing or otherwise engaging the switch 30 to start the saw 11. Then the operator can engage the brake handle 50 to release the brake. The cutting step further includes starting from the middle of the roof and cutting across the roof toward the edges, and includes the further step of then cutting down the roof (i.e. down the slope). According to one version of this method, the cutting step includes cutting the roof into a series of 2 foot-by-2 foot sections. This makes a convenient size for removal. In another version, the step includes cutting ridge vents along the ridge.

If at any time the roofer moves away from the assembly for any reason, he will release the switch 30 that is biased into the off position, and he will release the brake 20, which is also biased in the braking position. Thus, as the roofer moves away, the saw will stop and the wheels will lock and prevent movement of the assembly on the cutting surface, which is typically a roof.

The removing step includes starting at a corner of a section, loosening the perimeter, and keeping the section intact. A roofer can use a prying tool to loosen the section. The sections can then be disposed of in a conventional manner.

Obviously, many modifications and variations of the present invention are possible in light of the above teachings. Therefore, it is to be understood that within the scope of the appended claims the invention may be practiced otherwise than as specifically described. Moreover, the reference numerals are merely for convenience and are not intended to be in any way limiting.

We claim:

1. A roofing saw mount for supporting a removable handheld power saw assembly for cutting into a roof a predetermined depth, the saw mount comprising:
   a frame having a base with a front end and a rear end, and a handle extending generally upwardly from the rear end;
   a front wheel set rotatably carried on the front end of the base for supporting the frame in rolling movement above a roofing surface;
   a rear wheel set rotatably carried on the rear end of the base for supporting the frame in rolling movement above a roofing surface;
   a dead-man brake assembly associated with at least one of the wheel sets wherein the brake is engaged with the wheel set until it is released to permit wheel rotation;
   a saw platform adjustably mounted on the frame, the platform adapted to support the removable power saw a predetermined height above the roofing surface; and
   a height adjuster disposed between the frame and the saw platform for adjusting the saw platform relative to the frame.

2. The roofing saw assembly of claim 1 further including an electrical circuit carried by the frame including a switch and a connection for a power saw.

3. The roofing saw assembly of claim 1 wherein the switch is a dead-man switch.

4. The roofing saw assembly of claim 1, wherein the rear wheel set includes first and second wheels disposed co-axially on the frame where the first and second wheels are located on either side of the frame.

5. The roofing saw assembly of claim 4 wherein the front wheel set includes a plurality of wheels that are smaller in diameter than the rear wheels.

6. The roofing saw assembly of claim 1 wherein the height adjuster includes a discrete adjustment for making adjustments in discrete steps of a predetermined and fixed size, and continuous adjustment between the steps.

7. The roofing saw assembly of claim 1 wherein the deadman brake interacts with the rear wheel set.

8. The roofing saw assembly of claim 1 wherein the handle includes a hinge structure along its length to permit one part of the handle to pivot about the hinge from a collapsed position over the other part to an extended position away from the other part.

9. The roofing saw assembly of claim 1 further including a saw trigger depression device.

10. The roofing saw assembly of claim 1 further including a debris shield disposed on the frame for blocking debris flying from the rear of the saw.

11. The roofing saw assembly of claim 1 further including a restrictor plate slideably disposed on the saw platform to engage the saw and hold it in place.

12. A roofing saw assembly for cutting into a roof a predetermined depth, the saw assembly comprising:
   a power saw;
   a frame having a base with a front end and a rear end, and a handle extending generally upwardly from the rear end;
   a front wheel set rotatably carried on the front end of the base for supporting the frame in rolling movement above a roofing surface;
   a rear wheel set rotatably carried on the rear end of the base for supporting the frame in rolling movement above a roofing surface wherein the rear wheel set includes first and second wheels disposed co-axially on the frame where the first and second wheels are located on either side of the frame;
   a dead-man brake assembly associated with at least one of the wheel sets wherein the brake is engaged with the wheel set until it is released to permit wheel rotation;
   a saw platform carried on the frame, the platform adapted to support the power saw a predetermined height above the roofing surface;
   a height adjuster disposed between the frame and the platform for adjusting the saw platform relative to the frame; and
   an auxiliary wheel set carried by the frame adjacent the rear wheel set, the auxiliary wheel set being disposed between the rear wheels with the wheels in the set being spaced apart from each other a predetermined distance for supporting the frame and saw in rolling movement along a roof ridge.

* * * * *